United States Patent
Lee et al.

(10) Patent No.: US 10,198,529 B2
(45) Date of Patent: Feb. 5, 2019

(54) APPARATUS AND METHOD OF PROCESSING GRAPHIC DATA USING INDEX BASED TRIANGLE LISTING

(71) Applicant: UNIVERSITY-INDUSTRY COOPERATION GROUP OF KYUNG HEE UNIVERSITY, Yongin-si (KR)

(72) Inventors: Young-Koo Lee, Daejeon (KR); Mostofa Kamal Rasel, Yongin-si (KR); Jinseung Kim, Yongin-si (KR); Yongkoo Han, Yongin-si (KR); Kisung Park, Bucheon-si (KR)

(73) Assignee: UNIVERSITY-INDUSTRY COOPERATION GROUP OF KYUNG HEE UNIVERSITY, Yongin-si (KR)

( * ) Notice: Subject to any disclaimer, the term of this patent is extended or adjusted under 35 U.S.C. 154(b) by 185 days.

(21) Appl. No.: 15/051,686

(22) Filed: Feb. 24, 2016

(65) Prior Publication Data

US 2016/0246826 A1 Aug. 25, 2016

Related U.S. Application Data

(60) Provisional application No. 62/119,823, filed on Feb. 24, 2015.

(51) Int. Cl.
*G06F 17/30* (2006.01)

(52) U.S. Cl.
CPC .. *G06F 17/30958* (2013.01); *G06F 17/30292* (2013.01); *G06F 17/30294* (2013.01); *G06F 17/30498* (2013.01)

(58) Field of Classification Search
CPC ........ G06F 17/30321; G06F 17/30867; G06F 17/30194; G06F 17/30572
See application file for complete search history.

(56) References Cited

U.S. PATENT DOCUMENTS

| | | | | |
|---|---|---|---|---|
| 5,896,139 A * | 4/1999 | Strauss | ................... | G06T 17/20 345/440 |
| 7,404,056 B1 * | 7/2008 | Nordquist | ............... | G06F 9/384 711/162 |
| 7,594,095 B1 * | 9/2009 | Nordquist | ............. | G06F 9/4843 712/22 |
| 7,634,637 B1 * | 12/2009 | Lindholm | ............. | G06F 9/3851 712/13 |
| 7,747,842 B1 * | 6/2010 | Goudy | .................. | G06F 9/5011 710/57 |
| 7,750,915 B1 * | 7/2010 | Acocella | ............. | G06F 12/0846 345/541 |
| 8,074,224 B1 * | 12/2011 | Nordquist | ............. | G06F 9/3012 712/20 |
| 8,237,725 B1 * | 8/2012 | Bowman | ............... | G06T 15/005 345/502 |

(Continued)

*Primary Examiner* — Daniel A Kuddus
(74) *Attorney, Agent, or Firm* — Envision USA Inc

(57) ABSTRACT

The present invention is related to an index-based processing apparatus and method for listing triangles in massive graphs. The present invention provides an index join based triangle listing algorithm by presenting the new notions of vertex range index and potential cone vertex index. Also the present invention provides accessing indexed data asynchronously and joining them to list triangles using a multi-threaded parallel processing technique.

20 Claims, 20 Drawing Sheets

(56) References Cited

U.S. PATENT DOCUMENTS

| | | | |
|---|---|---|---|
| 9,104,665 B1* | 8/2015 | Bik | G06F 17/30958 |
| 9,116,738 B2* | 8/2015 | Jacob | G06F 9/46 |
| 9,135,565 B1* | 9/2015 | Khalefa | G06F 17/30958 |
| 9,495,477 B1* | 11/2016 | Dehnert | G06F 17/30958 |
| 2008/0143730 A1* | 6/2008 | Lindholm | G06F 9/5044 |
| | | | 345/501 |
| 2014/0019490 A1* | 1/2014 | Roy | G06F 17/30073 |
| | | | 707/798 |

* cited by examiner

<Input Massive Graph G>

<Oriented version of Graph G>

⎯⎯→ : candidate pivot edge
------→ : edge

FIG. 6

Input : $G = (V, E)$
Output: $G^o = (V, E^o)$, $G^i = (V, E^i)$, and $VRI$

1  $offset \leftarrow 0$
2  for *each $u \in V$* do
3  $\quad I \leftarrow u/R_{ALB}$
4  $\quad$ if $VRI_I^{Offset}$ *is not set yet* then
5  $\quad\quad VRI_I^{Offset} \leftarrow offset$
6  $\quad\quad VRI_I^{maxDegree} \leftarrow 0$
7  $\quad$ end
8  $\quad$ read $adj_G(u)$ from disk
9  $\quad$ while $adj_G(u)$ *is not empty* do
10 $\quad\quad$ remove $v$ from $adj_G(u)$
11 $\quad\quad$ if $deg_G(u) < deg_G(v)$ then
12 $\quad\quad\quad adj_{G^o}(u) \leftarrow v$
13 $\quad\quad$ else if $deg_G(u) = deg_G(v) \& u < v$ then
14 $\quad\quad\quad adj_{G^o}(u) \leftarrow v$
15 $\quad\quad$ else
16 $\quad\quad\quad adj_{G^i}(u) \leftarrow v$
17 $\quad\quad$ end
18 $\quad$ end
19 $\quad$ if $VRI_I^{maxDegree} < deg_{G^o}(u)$ then
20 $\quad\quad VRI_I^{maxDegree} \leftarrow deg_{G^o}(u)$
21 $\quad offset \leftarrow offset + deg_{G^o}(u) \times 4$
22 end

FIG. 8

Input : $G^i = (V, E^i), u_{end}$
Output: $VRI_{selected}, Thread_{disk}$ 1   $maxDegree \leftarrow 0$
2   Set all $flag$ of $VRI$ false
3   for each $u \in V^o_{mem}$ do
4      read $adj_{G^i}(u)$ from $G^i$
5      for each $v \in adj_{G^i}(u)$ do
6         if $v \notin V^o_{mem}$ then
7            $I \leftarrow v/N$
8            $VRI_I^{flag} \leftarrow true$
9         end
10      end
11 end
12 for $I = 1$ $to$ $VRI_{length}$ do
13      if $VRI_I^{flag} = true$ then
14         $VRI_{selected}[] \leftarrow I$
15         if $maxDegree < VRI_I^{maxDegree}$ then
16            $maxDegree \leftarrow VRI_I^{maxDegree}$
17         end
18      end
19 end
20 $Thread_{disk} \leftarrow (M - |VRI|/2)/maxDegree$
21 if $Thread_{disk} > Thread_N$ then
22      $Thread_{disk} = Thread_N$
23 end

FIG. 9

Input : $G^i = (V, E^i), u_{end}$
Output: $VRI_{selected}, Thread_{disk}$

1  $maxDegree \leftarrow 0$
2  Set all $flag$ of $VRI$ false
3  for each $u \in V^o_{mem}$ do
4      read $adj_{G'}(u)$ from $G^i$
5      for each $v \in adj_{G'}(u)$ do
6          if $v \notin V^o_{mem}$ then
7              $I \leftarrow v/N$
8              $VRI_I^{flag} \leftarrow$ true
9          end
10     end
11 end
12 for $I = 1$ to $VRI_{length}$ do
13     if $VRI_I^{flag} = true$ then
14         $VRI_{selected}[] \leftarrow I$
15         if $maxDegree < VRI_I^{maxDegree}$ then
16             $maxDegree \leftarrow VRI_I^{maxDegree}$
17         end
18     end
19 end
20 $Thread_{disk} \leftarrow (M - |VRI|/2)/maxDegree$
21 if $Thread_{disk} > Thread_N$ then
22     $Thread_{disk} = Thread_N$
23 end

FIG. 11

Input : $adj^o_{mem}$, $startVertex$, $endVertex$
Output: All $\triangle_{u,v,w}$, where $u \in V^o_{mem}$, $v \in V^o_{mem}$ &
$\qquad w = adj^o_{mem}(u) \cap adj^o_{mem}(v)$ 1. for $u = startVertex$ to $endVertex$ do
2.     for each $v \in adj^o_{mem}(u)$ do
3.         if $v \in V^o_{mem}$ then
4.             for each $w \in adj^o_{mem}(v)$ do
5.                 if $v \neq w$ & $w \in adj^o_{mem}(u)$ then
6.                     output $\triangle_{u,v,w}$
7.                 end
8.             end
9.         end
10.     end
11. end APPARATUS AND METHOD OF PROCESSING GRAPHIC DATA USING INDEX BASED TRIANGLE LISTING

CROSS-REFERENCE TO RELATED APPLICATIONS

This application claims the benefit of priority of U.S. Provisional Application No. 62/119,823 filed on Feb. 24, 2015 which is incorporated by reference in their entirety herein.

BACKGROUND

1. Field of the Invention

The present invention is related to a graphic related data processing, more particularly to an apparatus and a method of processing graphic data using index based triangle listing.

2. Related Art

With the fast growing popularity of social network applications in our society, social network analysis has emerged as a key technology that provides better social networking services. This is achieved through automated discovery of relationships within the social network and using this insight to provide value-added services, such as friend discovery, personalized advertisements, and spam filtering to name a few.

Social networks are used to capture and represent the relationships between members of social systems at all scales, from interpersonal to international. Using graphs is a typical methodology to represent social networks, where nodes of the graph connote people and edges connote their relationships, such as short messages, mobile calls, and email exchanges.

Triangle listing is a basic operator in dealing with many graph data such as social networks. However, in-memory algorithms don't work well in recent massive graphs since these graphs are so massive that they cannot fit into the memory. Although new algorithms based on external memory have been introduced, the existing studies still suffer from frequent multiple scans of the whole graph on the disk and tremendous calculation coming from involving the whole graph in every iteration.

Therefore, an I/O-efficient processing apparatus and method for massive graph based on triangle listing is needed.

SUMMARY

Exemplary embodiments of the present invention provide an index-based processing apparatus and method for listing triangles in massive graphs.

Another exemplary embodiments of the present invention provide an index join based triangle listing algorithm by presenting the new notions of vertex range index and potential cone vertex index.

Yet another exemplary embodiments of the present invention provide accessing indexed data asynchronously and joining them to list triangles using a multi-threaded parallel processing technique.

According to an aspect of the present invention, a method of processing graph data based on triangle listing performed by a graph data processing apparatus is provided. The method comprises receiving an original graph having vertices and edges, generating a first oriented graph and a second oriented graph from the original graph, wherein an adjacency list batch (ALB) representing the first oriented graph is stored in a storage device, generating a vertex range index (VRI) to indicate the ALB, the VRI including at least one of an address of a vertex of the ALB, maximum degree of the vertex, and a flag indicating the ALB, checking whether an elbow vertex of the first oriented graph is included in a vertex set adjacent to each vertex of the second oriented graph to obtain a potential cone vertex, the elbow vertex having one incoming edge and one outgoing edge in a triangle, the potential cone vertex being a candidate of cone vertices having at least two outgoing edges in a triangle, obtaining a cone vertex based on the elbow vertex, the potential cone vertex, VRI and the ALB, and reporting a triangle including the cone vertex and the elbow vertex.

In an aspect, the first oriented graph is an oriented version of the original graph having vertices with outgoing edges, and the second oriented graph is an oriented version of the original graph having vertices with incoming edges.

In another aspect, vertices in the ALB are listed in an increasing order of the indices of the vertices.

In yet another aspect, the adjacency list of the vertex is a variable length data.

In yet another aspect, the size of the VRI is equal to the total ALBs in the oriented graph.

In yet another aspect, the triangle includes a third vertex which is obtained from an intersection of a first adjacent set and a second adjacent set, the first adjacent set is a set of adjacent vertices of each cone vertex in the first oriented graph, and the second adjacent set is a set of adjacent vertices of each elbow vertex in the first oriented graph.

In yet another aspect, the method further comprises pinning or unpinning for reading the ALB pointed by the VRI into a memory based on the flag.

In yet another aspect, the obtaining a cone vertex is performed based on a self-joining operation.

In yet another aspect, the pinning or unpinning, and the self-joining operation regarding the ALB are performed separately and concurrently in different processing cores.

According to another aspect of the present invention, an apparatus of processing graph data based on triangle listing is provided. The apparatus comprises a memory configured to store data which is used or processed by a processor, an input interface configured to receive an original graph having vertices and edges as an input, an output interface configured to output a triangle processed by the processor, and the processor configured to: generate a first oriented graph and a second oriented graph from the original graph, wherein an adjacency list batch (ALB) representing the first oriented graph is stored in a storage device; generate a vertex range index (VRI) to indicate the ALB, the VRI including at least one of an address of a vertex of the ALB, maximum degree of the vertex, and a flag indicating the ALB; check whether an elbow vertex of the first oriented graph is included in a vertex set adjacent to each vertex of the second oriented graph to obtain a potential cone vertex, the elbow vertex having one incoming edge and one outgoing edge in a triangle, the potential cone vertex being a candidate of cone vertices having at least two outgoing edges in a triangle; obtain a cone vertex based on the elbow vertex, the potential cone vertex, VRI and the ALB; and report a triangle including the cone vertex and the elbow vertex.

In an aspect, the ALB includes at least one of an index of the vertex, a degree of the vertex and an adjacency list of the vertex.

In another aspect, the first oriented graph is an oriented version of the original graph having vertices with outgoing edges, and the second oriented graph is an oriented version of the original graph having vertices with incoming edges.

In yet another aspect, vertices in the ALB are listed in an increasing order of the indices of the vertices.

In yet another aspect, the adjacency list of the vertex is a variable length data.

In yet another aspect, the size of the VRI is equal to the total ALBS in the oriented graph.

In yet another aspect, the triangle includes a third vertex which is obtained from an intersection of a first adjacent set and a second adjacent set, the first adjacent set is a set of adjacent vertices of each cone vertex in the first oriented graph, and the second adjacent set is a set of adjacent vertices of each elbow vertex in the first oriented graph.

In yet another aspect, the processor is further configured to pin or unpin for reading the ALB pointed by the VRI into a memory based on the flag.

In yet another aspect, the obtaining a cone vertex is performed based on a self-joining operation.

In yet another aspect, the pinning or unpinning, and the self-joining operation regarding the ALB are performed

BRIEF DESCRIPTION OF THE DRAWINGS

FIG. 6 is an exemplary indexing process during graph orientation according to the present invention.

FIG. 8 illustrates pinning ALB according to the present invention.

FIG. 9 illustrates the process of joining between data in a storage and data in a memory.

FIG. 11 is an exemplary task for each child of the subtask 1.

DESCRIPTION OF EXEMPLARY EMBODIMENTS

Figure 1:
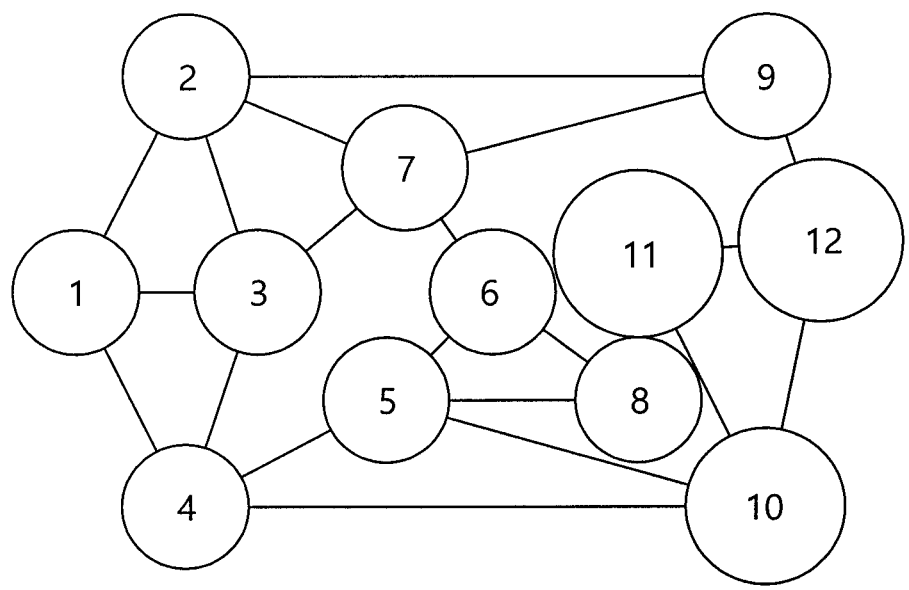
FIG. 1 is a diagram showing a triangle listing in a graph.

Some embodiments of the present invention will now be described in detail with reference to the accompanying drawings. It is to be noted that in assigning reference numerals to respective constituent elements in the drawings, the same reference numerals designate the same constituent elements although the constituent elements are shown in different drawings. Further, in describing the embodiments of the present invention, a detailed description of pertinent known constructions or functions will be omitted if it is deemed to make the gist of the present invention unnecessarily vague.

The present invention is directed to an apparatus and a method of processing graphic data based on triangle listing. It is to be appreciated that the present invention is particularly suited for use with massive graphs. Such graphs may pertain to social network analysis and other applications, as readily contemplated by one of ordinary skill in the related art, given the teachings of the present principles provided herein.

FIG. 1 is a diagram showing a triangle listing in a graph.

Referring to FIG. 1, graph G includes 7 triangles $\Delta_{1:2:3}$, $\Delta_{1:3:4}$, $\Delta_{2:3:7}$, $\Delta_{2:7:9}$, $\Delta_{4:5:10}$, $\Delta_{5:6:8}$, and $\Delta_{10:11:12}$. As seen in FIG. 1, triangle is a simple clique with three vertices. Triangle listing problem denotes the discovery of such cliques from a graph G=(V, E), where V and E are the sets of vertices and edges, respectively. Triangle listing plays the vital role in different studies of graph theory, database literatures, network analysis, knowledge discovery in large collection of data, etc. For example, triangle listing is used for deriving measurements for networks such as clustering coefficient, triangular connectivity, and transivity. Fast triangle listing can also be applied to mining dense subgraphs and sorting out spams.

Triangle listing has become an interesting problem to researchers as with the popularity of social networks. There are many in-memory algorithms proposed for listing triangles in a graph. However, nowadays the graph size is becoming too large to fit in the memory. For example, the number of users (nodes) on Twitter has exceeded 645 million (by Twitter statistics @ONLINE, 2014), and over 1 billion unique and active users are visiting Facebook per month (by Facebook statistics @ONLINE, 2014).

These users (considered as vertices) are communicating with their friends (considered as edges) and thus the graph size is becoming tremendous. Other networks such as email networks, stock-markets networks, and links of web pages are also becoming larger and larger. These massive networks and graphs demand a scalable and efficient triangle listing algorithm that can operate beyond memory.

External memory triangulation algorithms perform repetitive scans on the storage data for complete triangle listing. Therefore, performance of the algorithms highly depends on I/O efficiency. A conventional art includes a graph partitioning technique for storage based triangle listing. Though this algorithm ensures the completeness of triangle listing over large graphs, the algorithm may require a lot of reads and writes to storage and the performance highly depends on the type of graphs. Another conventional art noticed these limitations, and proposed an I/O and CPU efficient algorithm. This state-of-the-art algorithm outperforms the predecessor by an order of magnitude.

Yet another conventional art proposed a FlashSSD-based parallel triangulation framework that outperforms the state-of-the-art marginally. In the triangulation problem, for every edge, a triangle condition is verified with their neighbor vertices, where the neighbor vertices are scattered over the storage (i.e. a disk) resident graph. Existing external memory algorithms read a set of edges into memory in every iteration and scan the whole graph to access the neighbor vertices for that set of edges. Involving the whole graph in every iteration causes tremendous calculations for existing algorithms. Moreover, this inefficient mechanism incurs expensive costs of storage I/O. The I/O cost occupies a significant portion of the total execution time.

In an aspect, an apparatus and a method of processing graphic data based on triangle listing according to the present invention performs an indexing method which is used for direct accesses to the neighbor vertices. If adopted to database systems, the apparatus and method may allow on demand access to desired and/or selected data on storage and reduce I/O cost coming from the iterative full scans for triangulation.

In another aspect, an apparatus and a method of processing graphic data based on triangle listing according to the present invention performs asynchronous accessing to storage resident indexed data. The apparatus performs the steps of issuing, by multiple independent processing units of a program, asynchronous I/O requests to different indexed data blocks, and processing those data in parallel. That is, the apparatus and method performs reading the neighbors of edges from an indexed graph asynchronously and process them in parallel using multiple processing units. This parallel mechanism ensures reduced processing cost of a program. And accessing the selective parts of the graph and processing them in parallel with multiple cores would be more effective way for triangle listing.

In yet another aspect of the present invention, an apparatus and a method of processing graphic data based on triangle listing according to the present invention provides a new notions of vertex range index and potential cone vertex index to process graphic data. This processing is also referred to as an index join based triangle listing algorithm. This index mechanism reduces the number of I/O requests by accessing the selected part of the storage (i.e. a disk) resident graph.

In yet another aspect, an apparatus and a method of processing graphic data based on triangle listing according to the present invention performs joining the indexed data using multi-threaded parallel processing technique. Since the indexed data can be accessed asynchronously, the apparatus and method performs the steps of dividing the triangulation into independent calculation for multiple subsets of edges, and assigning them to multiple processors (or multicores). This parallel processing dramatically accelerates the speed of the algorithm.

For better understanding of embodiments in the detailed description, some preliminaries and notations are described hereinafter.

Preliminaries

1. Notations

The apparatus of processing graphic data based on triangle listing according to the present invention processes an undirected input graph $G=(V,E)$. The apparatus stores graph G on a storage (i.e. a disk) in a set of adjacency lists, where each list consists of a node (or a vertex) id u, the number of neighbors of $adj_G(u)$, and the id list of neighbors of u. The apparatus configures to order all vertices of G according to their ids. Additional notations used to describe the embodiments of the present invention are also listed in Table 1.

TABLE 1

| Symbol | Description |
|---|---|
| $G = (V, E)$ | Undirected input graph |
| V | Set of vertices in G |
| u, v, w, etc. | vertex ids in G each of which is represented by a 4-byte integer |
| E | Set of edges in G |
| \|V\| | No. of vertices in G |
| \|E\| | No. of edges in G |
| $adj_G(u)$ | The set of adjacent vertices of u in G |
| $deg_G(u)$ | Degree of u in G |
| $G° = (V, E°)$ | Oriented version of G having outgoing edges |
| $E°$ | Set of outgoing edges in $G°$ |
| $\|E°\|$ | No. of outgoing edges in $G°$ |
| $adj_G°(u)$ | The set of adjacent vertices of u in $G°$ |
| $deg_G°(u)$ | Degree of u in $G°$ |
| $G^i = (V, E^i)$ | Oriented version of G having incoming edges |
| $E^i$ | Set of incoming edges in $G^i$ |
| $adj_G^i(u)$ | The set of adjacent vertices of u in $G^i$ |
| $\Delta_{u, v, w}$ | A triangle formed by u, v, and w |
| B | Size of a storage block |
| M | Size of memory |
| $E_{mem}$ | Edges that are loaded into memory |
| $V°_{mem}$ | Vertices whose adjacency list are loaded into memory from $G°$ |
| $adj°_{mem}$ | Adjacency lists that are loaded into memory from $G°$ |
| \|VRI\| | Memory space required for vertex range index (VRI) |
| $VRI_{length}$ | No. of adjacency list batchs (ALBs) pointed in VRI |
| $R_{ALB}$ | No. of adjacency lists in an ALB pointed by each entry of VRI |
| I | An index id in VRI |
| $VRI_{selected}$ | List of pinned index entries of VRI |
| $VRI_i^{thread}$ | List of pinned index entries assigned to $i^{th}$ thread |
| $VRI_i^{maxdeg}$ | Highest degree of the members in an ALB pointed by $i^{th}$ index |
| $Thread_N$ | No. of cores available in computer |
| $Thread_{disk}$ | No. of cores assigned for joining disk and memory data |

2. Sparse Index

The apparatus of processing graphic data according to the present invention provides a sparse index for a group of some ordered records in a relational database system, where the size of all groups is equal. The apparatus indexes the database by pointing the first record of each group. To read a record from a storage (i.e. a disk), sparse index may allow to traverse only the group which the record belongs to. It reduces the number of I/Os since it does not require full scan of database. Therefore, I/O efficiency can be achieved with a little memory for indices.

3. Block Nested Loop

The apparatus of processing graphic data according to the present invention provides joining two relations R and S in a relational database. For example, the joining can be performed based on Block Nested Loop join algorithm. Here R and S are the outer and inner relations, respectively. The apparatus reads memory-sized tuples from R in a form of mapping table. Then the apparatus scans the relation S by reading tuples one by one, and matches them into hash table to produce output. After joining S and part of R, the apparatus loads the next memory-sized tuples from R, and again scan S to perform join operation. Block Nested Loop join algorithm gives an I/O complexity of $O(|R| |S|/M_t B_t)$, where |R| and |S| are the number of tuples in R and S, and $M_t$ and $B_t$ are the number of tuples in memory and storage blocks, respectively.

When the relation S is indexed, the apparatus may give better I/O performance based on Indexed Nested Loop join algorithm as a full scan over S is not required.

Figure 2:
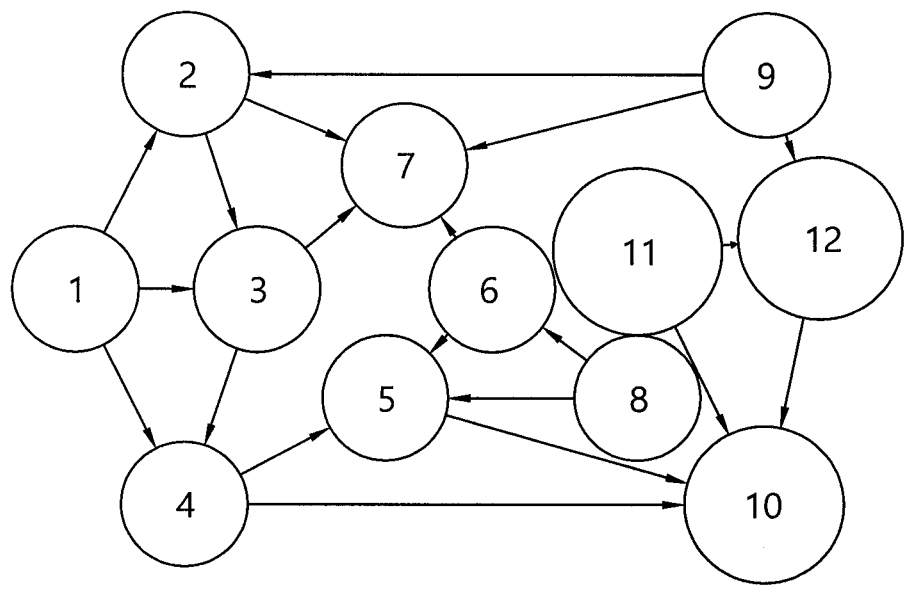
FIG. 2 is a diagram showing an oriented version of graph G based on massive graph triangulation (MGT) according to an embodiment of the present invention.

FIG. 2 is a diagram showing an oriented version of graph G based on massive graph triangulation (MGT) according to the present invention.

Referring to FIG. 2, the apparatus of processing graph data according to the present invention takes an undirected graph G as an input. The apparatus first converts G to an oriented version G° by following conditions.

TABLE 2

For any two vertices u and v of G,
i. If $\deg_G(u) < \deg_G(v)$, edge $(u, v) \in E$ directs from u to v.
ii. If $\deg_G(u) = \deg_G(v)$, edge $(u, v) \in E$ directs from u to v when u has an smaller id than v.

Such conversion of the graph benefits in two ways. First, it reduces the graph size to almost half of its original size. Second, since the graph is oriented by directing the edge from large degree vertex to small degree vertex, large degree of the vertices are reduced that finally impacts on the computation for triangulation. The oriented graph G° from G is obtained with the cost of O (SORT(|E|) I/Os by performing external sort algorithm.

Figure 3:
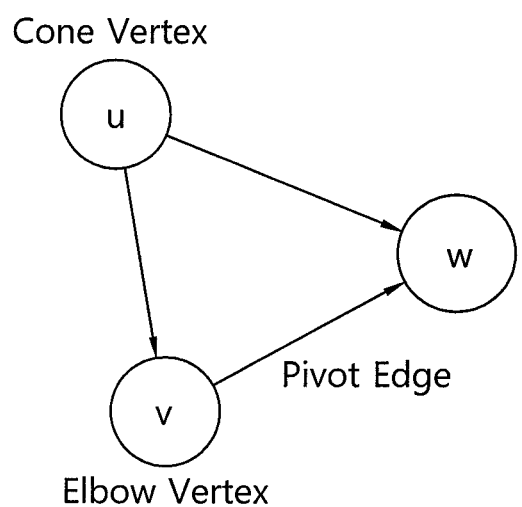
FIG. 3 is a diagram showing a triangle in an oriented version of graph G according to the present invention.

Each triangle in the oriented graph G° is defined by at least two notions as illustrated in FIG. 3.

FIG. 3 is a diagram showing a triangle in an oriented version of graph G according to the present invention.

Referring to FIG. 3, a triangle in G° includes vertices u, v and w. The triangle is also defined by two notions, "a cone vertex" and "a pivot edge". The cone vertex is defined as a vertex with two outgoing edges in a triangle. In FIG. 3, the vertex u is a cone vertex among 3 vertices since only u has 2 outgoing edges. The pivot edge is defined as an edge which has two non-cone vertex endpoints. In FIG. 3, the edge (v, w) is a pivot edge since the vertices v and w are not a cone vertex.

The apparatus iteratively scans all the adjacency lists of G°. In every iteration, following two steps are performed by the apparatus.

i. Read the next cM size edges into $E_{mem}$. M is a size of the whole memory and c(<1) is evaluated for measuring the memory space required to maintain other data such as the set of vertices which have outgoing edges into $E_{mem}$.

ii. Scan the whole graph G° from a storage (i.e. a disk) and list all triangles whose cone vertices are in V and pivot edges are in $E_{mem}$. In the first step, the apparatus reads vertices and their outgoing edges into memory until $E_{mem}$ exceeds cM. In the second step, each $u \in V$ and $adj_G°(u)$ are read from G°. After reading the data from the storage in the unit of blocks, they process the vertices one by one. Then the apparatus reports all triangles, i.e. $\Delta_{u,v,w}$, where u is the cone vertex and $\{(v,w)|(v,w) \in adj_G°(u)\}$ is the pivot edge in $E_{mem}$. A hash structure can be used for $E_{mem}$ that allows to find any edge (u, v), (u, w), or (v, w) from $E_{mem}$ in O (1) time.

Figure 4:
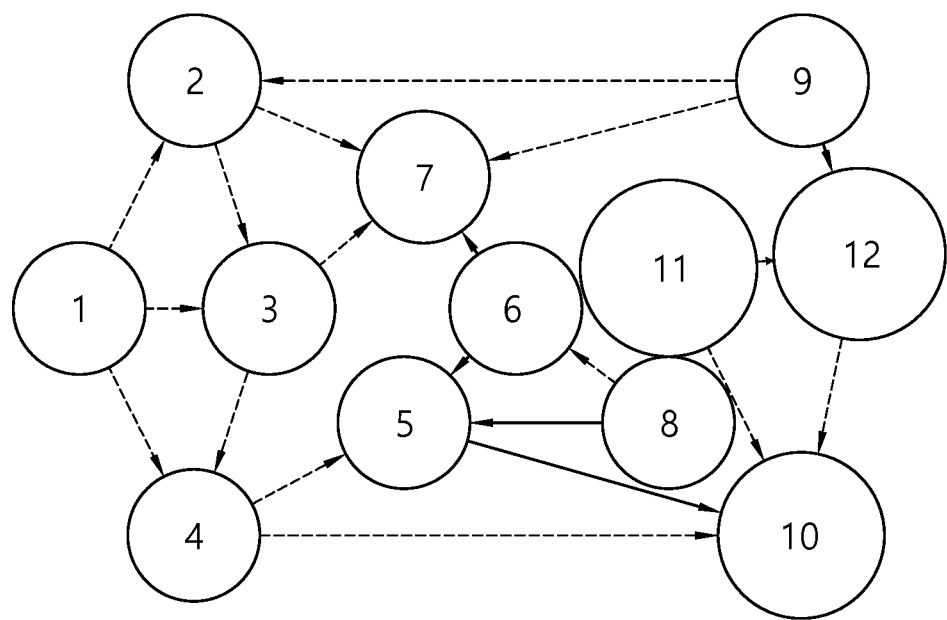
FIG. 4 is a diagram illustrating $E_{mem}$ and triangle discovery according to the present invention.

FIG. 4 is a diagram illustrating $E_{mem}$ and triangle discovery according to the present invention.

Referring to FIG. 4, candidate pivot edges of G° are marked by solid arrows. Specifically, the candidate pivot edges in $E_{mem}$ are (5, 10), (8, 5), (8, 6), (6, 5), (6, 7), (11, 12) and (9, 12). Vertex 4 (cone vertex) creates a triangle $\Delta_{4,5,10}$ since the pivot edge (5, 10) can be achieved from the vertex 4. Similarly, the pivot edge (6, 5) can be discovered from $adj_G°(8)$. The apparatus assumes that for any vertex $u \in V$, $adj_G°(u)$ can be fit into cM/2 size memory. Therefore, if any vertex $u \in V$ of G has a larger degree than cM/2, then the apparatus calculates triangles for this vertex and may remove some edges from the vertex. After some edges are removed, new undirected graph G" is produced which can satisfy the assumption. The apparatus then processes the orientation version of G°.

The two steps of the MGT algorithm look similar to the block nested loop join. This is a self-join with the outer relation $R = E_{mem}$ and the inner relation $S = \{adj_G°(u)|u \in V\}$.

The I/O complexity of the block nested loop join is $O(|R|^2/M_tB_t)$ which is equal to I/O complexity of MGT $(O(|E|^2/MB))$. In addition, since the MGT algorithm considers that any vertex $u \in V$ of G° that has an outgoing edge to $E_{mem}$ is the cone vertex, it drives them to perform full scan on graph in every iteration. In real environments, however, not all vertices $u \in V$ are the cone vertices in a massive directed graph. For example, in FIG. 4, vertices 2, 3, 4, 5, 6, 8, and 9 have outgoing edges to storage resident edges (5, 10), (6, 5), (6, 7), (8, 5), and (8, 6). Since only vertices 4 and 8 are cone vertices that can create triangles, it could be wasteful for the apparatus to perform full scan on graph in every iteration.

As an embodiment of the present invention, a method and an apparatus for applying an index technique to triangle listing for reducing disk I/Os is provided.

The method includes reading the adjacency lists of only the cone vertices (i.e. 4 and 8 in FIG. 4) to avoid many I/Os and to prevent full scans of the relation. The method may also include indexing the inner relation S. If the adjacency lists of cone vertices in G° are indexed on a storage (i.e. a disk), direct reading is possible. That is, the method may dramatically reduce I/Os from the storage (i.e. a disk) and corresponding computations in memory in every iteration. This process of the present invention can be referred to as index join based parallel triangulation (iTri). The process uses potential cone vertex indices and vertex range indices.

As another embodiment of the present invention, a method and an apparatus of parallel triangulation approach using multicores, which is an optimizing technique working with the index technique accordingly is provided.

Embodiment 1—Indexing Oriented Graph

For the convenience of description of the present invention, some of the features for efficient indexing on graph G° are defined hereinafter.

(1) Elbow Vertex

The elbow vertex of a triangle in the oriented graph is defined as the vertex with one incoming edge and one outgoing edge. In a different aspect, the elbow vertex can be also defined as a destination vertex of an edge and a source vertex of another edge at the same time. For example, in FIG. 3, v is the elbow vertex of triangle $\Delta_{u,v,w}$. Here, destination v of directed edge (u, v) meets the source v of another directed edge (v, w). In other words, the elbow vertex is the source vertex of the pivot edge in every triangle reported by MGT. For example, in FIG. 4, the vertices 5 and 6 are elbow vertices.

(2) Potential Cone Vertex (PCV)

The potential cone vertex in the oriented graph is defined as the vertex that has an outgoing edge to an elbow vertex. For example, vertex u can be considered as a potential cone vertex of triangle $\Delta_{u,v,w}$ in FIG. 3. Similarly, the vertices 4, 6, and 8 are potential cone vertices in FIG. 4 since they have outgoing edges to elbow vertices 5, 6. However, only the potential cone vertices, 4 and 8 are real cone vertices that create triangles.

(3) Potential Cone Vertex Index

The potential cone vertex index in the oriented graph is defined as an index of vertex that has at least one outgoing edge to an elbow vertex. For example, in FIG. 4, the elbow vertex 5 has incoming edges from the potential cone vertices 4, 6, and 8. By constructing a potential cone vertex index for the elbow vertex 5, the apparatus can access to its incoming neighbors 4, 6, and 8 directly.

The apparatus maintains the adjacency lists of incoming neighbors for every elbow vertex to facilitate the potential cone vertex index. An oriented graph $G^i=(V,E^i)$ of G holds these adjacency lists, where all $u \in V$ of $G^i$ are elbow vertices and all $v \in adj_G^i(u)$ are potential cone vertices. The oriented graph $G^i$ and $G^o$ can be easily obtained from the input graph G concurrently.

For any two vertices u, v of the input graph G, the conversion is defined by giving the direction of the edge (u, v), and putting it either in graph $G^i$ or $G^o$ as table 3. That is, the apparatus performs the steps of giving the direction of the edge (u, v), and putting (or inserting or including) the edge either in graph $G^i$ or $G^o$ as table 3.

TABLE 3 i. If $deg_G(u) < deg_G(v)$, place directed edge (u, v) in $G^o$.
ii. If $deg_G(u) = deg_G(v)$ and u has an smaller id than v, place directed edge (u, v) in $G^o$.
iii. Otherwise, place directed edge (v, u) in $G^i$.

Referring to table 3, the apparatus stores all vertices $u \in V$ and their adjacency lists of both $G^o$ and $G^i$. In an aspect, the apparatus may store the vertices $u \in V$ and their adjacency lists of both $G^o$ and $G^i$ in the same order in two different files respectively. In another aspect, the apparatus reads the adjacency lists of $u_{from}$ to $u_{to}$ from $G^o$ where $u_{from}$ and $u_{to}$ are the start and end vertex in memory. $u_{from}$ to $u_{to}$ may be the elbow vertices. Then the apparatus obtains the potential cone vertices from the adjacency lists of vertices $u_{from}$ to $u_{to}$ of the graph $G^i$.

Accordingly, the apparatus reads each elbow vertex for triangulation once, so thus the apparatus reads potential cone vertices for an elbow vertex once. Hence, it is required for the apparatus to perform only one sequential scan over $G^i$ to obtain the potential cone vertices for all elbow vertices of $G^o$. This results in a specific property based on which $G^i$ is accessed sequentially by the apparatus to obtain the potential cone vertex index for only the elbow vertices which are loaded into memory, thus only one scan of $G^i$ is required for the entire triangulation process.

$G^i$ holds the adjacency lists of only incoming neighbors, where $G^o$ contains outgoing neighbors of input graph G. Therefore, both $G^i$ and $|G^o|$ require equal storage space and in combination they occupied $|G|+|V|$ storage space. Though this method requires extra storage space for indexing potential cone vertex, this index allows to find potential cone vertices directly. Furthermore, the extra storage space for indexing potential cone vertex can be significantly reduced based on an aspect of the present invention.

It is obvious that the apparatus needs to access the adjacency lists of potential cone vertices of in-memory elbow vertices to probe for triangles. During the process of accessing, some adjacency lists of potential cone vertices can be already found in the memory which are actually loaded as the adjacency lists of elbow vertices. Therefore, it may be considered that reading the adjacency lists $adj_G^o(u)$ only for the potential cone vertices may reduce the I/Os greatly.

In order to accomplish the I/Os reduction, an aspect of the present invention provides an additional index data that maps the given potential cone vertex u to the location of its adjacency list $adj_G^o(u)$. Indexing all vertices of $G^o$ in storage (i.e. a disk) will take additional large amount of space. Moreover, if this additional index data is accessed with random vertex IDs unlike the potential cone vertex index, which will incur severe performance degradation if the index resides on the storage. It is impractical to read the full index entries into storage for all the vertices, in particular, for a very large graph.

To reduce the amount of memory space for additional indexing, another aspect of the present invention provides the additional index data as a sparse index for indexing ordered file that indexes data blocks rather than indexing all the items to reduce memory footprint.

Adjacency lists of index are variable length data unlike other data blocks used for ordinary database system which have the same size. Therefore, yet another aspect of the present invention provides the index structure for additional indexing to have variable length data block. The index structure helps or enables for the apparatus to index a group of adjacency lists. For the apparatus to implement the index structure for additional indexing, an adjacency list batch (ALB) and a vertex range index (VRI) as the additional index data to indicate the ALB are defined hereinafter.

(4) Adjacency List Batch (ALB)

A group of ordered vertices and their adjacency lists is defined as the adjacency list batch (ALB), where the difference ($R_{ALB}$) between first vertex id and last vertex id of that group is always equal. For example, in FIG. 5, the difference for the first vertex id and the last vertex id in each ALB of $G^o$ is 2. Therefore the first vertex id and the last vertex id of $ALB_1$ is 1 and 3 respectively, whose difference is given by 2. The difference is applied to other ALBs 2, 3, 4, . . . in the same manner.

(5) Vertex Range Index (VRI)

Vertex range index (VRI) is defined as an additional index that indexes an ALB. Like sparse index, every index entry of vertex range index points to the specific member (i.e. the first member) of its corresponding ALB. An exemplary way of computing the index entry of VRI for an ALB of a given vertex $u \in V$ is given by Equation (1).

$$I = \text{floor}(u/R_{ALB}) \quad \text{[Equation 1]}$$

Figure 5:
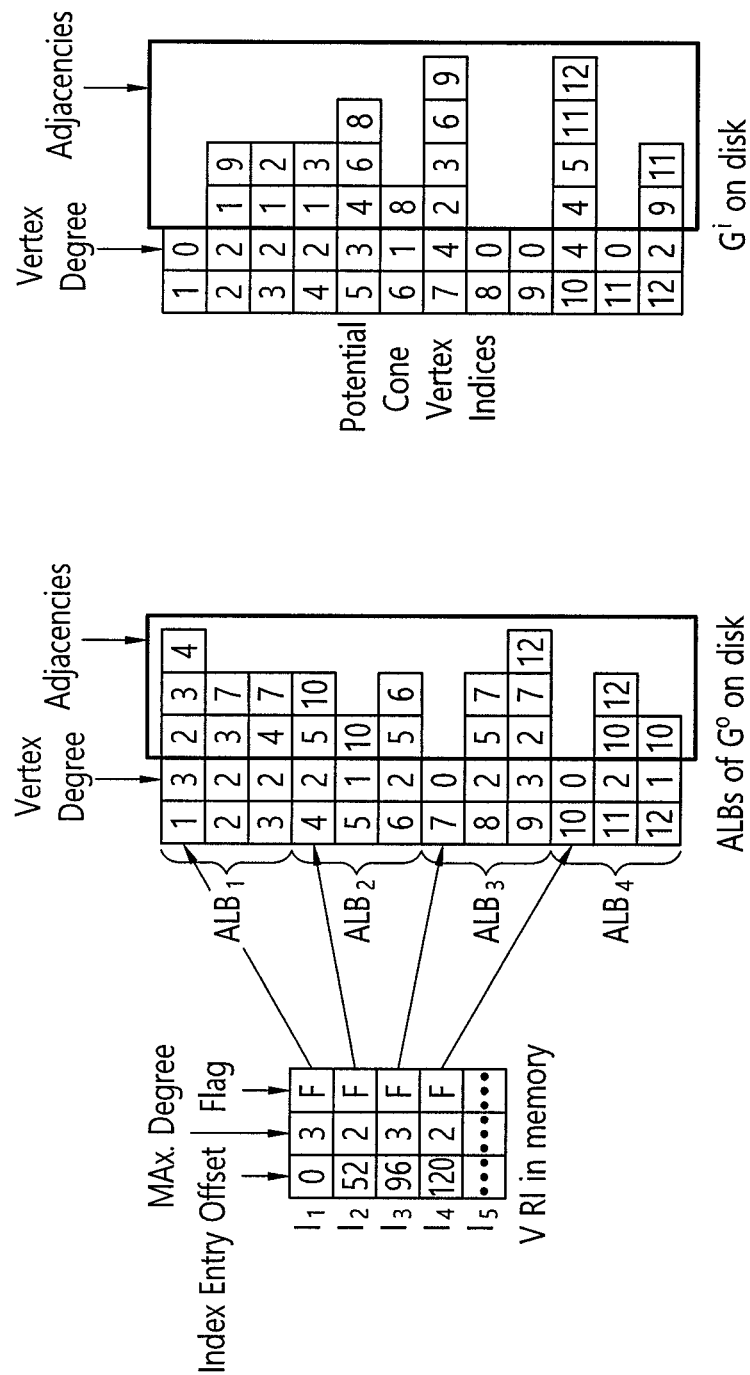
FIG. 5 illustrates the ordered representation of $G^i$ and $G^o$ on a storage according to the present invention.

FIG. 5 illustrates the ordered representation of $G^i$ and $G^o$ on a storage according to an embodiment of the present invention when the input graph is given as FIG. 1. It is assumed that data blocks occupied by different ALBs are not equal.

Referring to FIG. 5, the apparatus is configured to read the adjacency list $adj_G^o(u)$ from a storage (i.e. a disk) by traversing only the data blocks occupied by the ALB of vertex u. Adjacency lists of vertices 1~3, 4~6, 7~9, and 10~2 are the ALBs.

In an aspect, a data structure (or a data block) is provided for the ordered representation. For example, ALBs of $G^o$ are stored in the storage in block-wise according to the exemplary format depicted in FIG. 5. The apparatus stores $ALB_1$ in a first data block, $ALB_2$ in a second data block, and so forth. And each data block corresponding to an ALB is configured to include vertex index of the ALB in the $1^{st}$ column of the storage (or leftmost column) in an increasing order of the vertex index, is configured to store vertex degree of each corresponding vertex of the ALB in the $2^{nd}$ column of the storage (or $2^{nd}$ leftmost column), and is configured to store adjacencies of each corresponding vertex of the ALB from the $3^{rd}$ column to the right of the storage.

For example, vertices 1, 2, 3 of $ALB_1$ are stored in the $1^{st}$ column of the storage in an increasing order of index. Since vertices 1, 2, 3 have vertex degree of 3, 2, 2, respectively, the vertex degree 3, 2, 2 are stored in the $2^{nd}$ column the storage, with each vertex degree locating at the same row with the corresponding vertex in the storage. And vertex 1 also has adjacencies 2, 3, 4. So adjacencies 2, 3, 4 are stored in the same row with vertex 1 in an increasing order of adjacency index. The way of storing adjacencies of other vertices in $ALB_1$ is the same as in the vertex 1. If the difference $R_{ALB}$ is given by 2 as FIG. 5, the vertices 1, 2, 3 are grouped into a single ABL, whose index is $ALB_1$.

The column number of the storage in which components of ALB are stored as shown in FIG. 5 can be differently configured from the above examples. And the present invention also includes other variations stemming from switching or omitting of the column number in the storage prepared for components included in an ALB.

The apparatus can map VRI to graph $G^o$. The size of VRI is equal to the number of the total ALBS in graph $G^o$. Each index entry $I_n$ of VRI includes the start address of the first vertex of each ALB (that is, index entry offset). Additionally, each index entry also includes the maximum (or highest) degree of each ALB and a flag indicating an ALB. The flag pins and unpins an index entry for reading the pointed ALB into memory. Since the size of VRI is very small, the apparatus can safely keep it in memory. And the apparatus constructs the VRI into memory while converting the input graph to the oriented versions. An exemplary indexing process during graph orientation including the process of Table 3 can be implemented as shown in FIG. 6.

Referring to FIG. 6, the apparatus gets an input of graph G, and may output oriented graphs $G^o$, $G^i$ and VRI as shown in FIG. 5 as a result. To output the result, the apparatus may pin an index entry of VRI that points to an ALB several times for multiple vertices in different times. In every iteration, the apparatus waits until the last vertex pins its corresponding index entry. This approach allows to read an ALB only once, and not to read this ALB every time.

Embodiment 2—Index Based Processing

According to another embodiment, the apparatus further provides listing the triangles from oriented graph $G^o$ and processing the additional index data sequentially.

The apparatus reports a triangle if an outgoing neighbor of a potential cone vertex is also an elbow vertex, and both of the potential cone vertex and the elbow vertex have a common outgoing neighbor. But in data processing perspective, the apparatus may access elbow vertices in $V^o_{mem}$ and their adjacency lists $adj^o_{mem}$ for potential cone vertices frequently. Therefore, an efficient in-memory data structure is required to minimize the cost of frequent access.

Since all vertices of graph $G^o$ are ordered, the apparatus keep the id for first and last vertex of $V^o_{mem}$. Here all the vertices in $V^o_{mem}$ are considered as elbow vertices. The apparatus applies hashing in every $\{\{w \in adj^o_{mem}(v)\}|v \in V^o_{mem}\}$. For a given outgoing neighbor v of a potential cone vertex u, this data structure can check the existence of an elbow vertex v in $V^o_{mem}$ with the cost of O(1) time. Again for a given outgoing neighbor w of a potential cone vertex u, it can check the existence of w in $adj^o_{mem}(v)$ in O(1) time.

Thus the data structure ensures the minimum joining cost for the indexed based iTri algorithm. The apparatus runs in iterations and for each iteration the apparatus performs the following three steps in table 4.

TABLE 4 i. Read next (M−|VRI|)/2 size adjacency list into $adj^o_{mem}$.
ii. Pin index entries which point ALBs containing potential cone vertices.

TABLE 4-continued iii. Report all triangles $\Delta_{u,v,w}$, where u is the cone vertex, v is the elbow vertex, and w = $adj_G^o(u) \cap adj^o_{mem}(v)$.

Referring to Table 4, the apparatus starts reading (or monitoring or checking) $adj_G^i(u)$ from $G^i$ for all elbow vertices in $V^o_{mem}$ to obtain potential cone vertices at the end of the first step. Since adjacency lists of elbow vertices in both $G^i$ and $G^o$ are stored in the storage (i.e. a disk) in same order, the apparatus may gradually scan the next adjacency lists of $G^i$ until the last vertex of $V^o_{mem}$. Notice that the apparatus only reads the adjacency lists for the elbow vertices of $V^o_{mem}$. It implies that the apparatus performs only one sequential scan over $G^i$ throughout all iterations.

The apparatus then reads the adjacency list $adj_G^i(v)$ of an elbow vertex v as an unit of data block from the storage and process one by one. If $\{u \notin V^o_{mem} | u \in adj_G^i(v)\}$, then the apparatus obtains the index entry I for potential cone vertex u applying Equation (1), and pins it.

Figure 7:
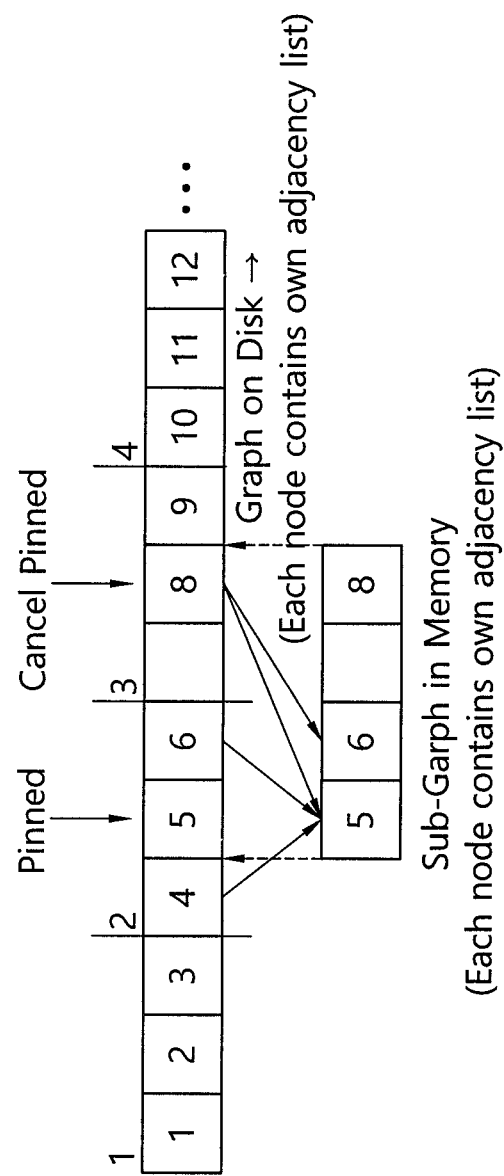
FIG. 7 illustrates the pinning mechanism of VRI entries according to the present invention.

FIG. 7 illustrates the pinning mechanism of VRI entries according to the present invention.

Referring to FIG. 7, vertices 5 and 6 have in-coming edges from vertices 4, 6 and 8. Therefore, vertices 4, 6 and 8 are considered as potential cone vertices, and the apparatus pins their corresponding index entries $I_2$ and $I_3$.

The apparatus can discover triangles, whose cone vertices and elbow vertices are already in $V^o_{mem}$, from $adj^o_{mem}$. The apparatus performs self-joining operation within $adj^o_{mem}$ to find those triangles. The apparatus does not need to pin an index entry of a potential cone vertex u if u is already in $V^o_{mem}$.

For example, in FIG. 7, index entry $I_3$ is pinned for only the potential cone vertex 8, adjacency list pointed by which can also be obtained from $adj^o_{mem}(8)$. Therefore, the apparatus unpins the pinned 13 and accesses the adjacency list of vertex 8 from $adj^o_{mem}$. Definitely, this approach reduces some I/Os.

Referring back to table 4, the apparatus obtains a list of pinned index entries ($VRI_{selected}$) at the end of second step. Here, $VRI_{selected}$ actually points to the adjacency lists of potential cone vertices.

The apparatus only reads the ALBS from a storage (i.e. a disk) that are pointed by the index entries of $VRI_{selected}$ at the last step. The apparatus then processes one adjacency list of potential cone vertex at a time, and removes it from memory after processing. It is assumed that for any vertex u∈V, adjacency list $adj_G^o(u)$ can be fit into (M−|VRI|)/2 size memory. All elbow vertices u of $V^o_{mem}$ are ordered.

An exemplary detailed process regarding Table 4 can be implemented as shown in FIGS. 8 and 9.

FIG. 8 illustrates pinning ALB according to the present invention.

Referring to FIG. 8, the apparatus gets an input of graph $G^i$, and may output $VRI_{selected}$, $Thread_{disk}$ as shown in FIG. 8 as a result.

Lines 1 to 11 describes that the apparatus performs sequential scanning and pinning index entries according to steps 1 and 2 in Table 4. And lines 12 to 19 describes that the apparatus obtains the final list of all pinned ALBS.

According to the present invention, the apparatus only maintains the start and end vertex id of $V^o_{mem}$ in memory. Since the apparatus does not consider to maintain further information into memory, it is assumed that any adjacency lists of potential cone vertices can be fit into the rest (M−|VRI|)/2 size memory.

By using the outcomes resulting from the process of FIGS. 6 and 8, the apparatus can perform the index based join operations as shown in FIG. 9 in an exemplary aspect.

FIG. 9 illustrates the process of joining between data in a storage and data in a memory.

Referring to FIG. 9, the apparatus gets an input of graph $G^o$, $VRI_i^{thread}$ and may output all triangles where u is the cone vertex, v is the elbow vertex, and $w=adj_G(u) \cap adj^o_{mem}(v)$. Lines 1 to 19 describes the exemplary detailed procedure of obtaining triangles by joining operations.

Embodiment 3—Parallel Processing

In an embodiment, the apparatus and method of the present invention adopts parallelism for two different levels in every iteration. In this embodiment, the apparatus may perform pinning multiple ALBs, and joining each of ALBs with $adj^o_{mem}$ separately. This implies that the apparatus can utilize the multiple cores to read and process the data of ALBs concurrently. This approach reduces the processing times for the selected ALBs.

Figure 10:
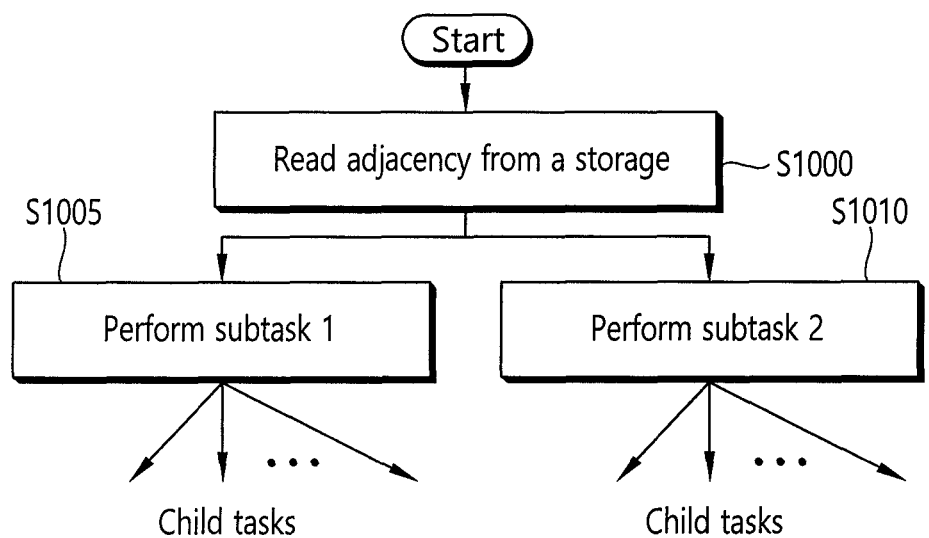
FIG. 10 illustrates a flow of parallel processing in a single iteration according to the present invention.

FIG. 10 illustrates a flow of parallel processing in a single iteration according to the present invention. In this example, the apparatus may include or utilize the multi-cores to processes the selected ALBS concurrently.

Referring to FIG. 10, the apparatus reads adjacency from a storage (S1000). The apparatus can read the data blocks on storage asynchronously.

In an aspect, before performing S1000, the apparatus may perform indexing during graph orientation and constructing additional index VRI as illustrated in embodiment 1 accompanied by FIGS. 5 and 6. In this case, S1000 may include reading $adj_G^i(u)$ from $G^i$. So the first level of parallelism starts immediately after finishing the indexing step.

When parallel processing is indicated or supportable, the apparatus divides the next task into subtasks. In an aspect, the subtasks include at least subtask 1 (self-joining) and subtask 2 (pin index entries, join between selected ALBs & memory data, and assigns them to multiple (i.e. two) different working threads).

At subtask 1, the apparatus virtually divides the $adj^o_{mem}$ such that each group contains almost equal number of edges, and assigns only one range of ordinal vertex adjacencies to each child of subtask 1 (S1005). The number of children for subtask 1 depends on the available cores in computer. An exemplary task for each child of the subtask 1 is described in FIG. 11.

At subtask 2, the apparatus pins index entries according to an algorithm as shown in FIG. 8 (S1010), while the apparatus initiates the second level parallelism by dividing its task to further smaller subtasks at subtask 1. At subtask 2, the apparatus also divides the join process, and adopts the second level parallelism after finishing the pinning process.

In case of subtask 2, the apparatus divides $VRI_{selected}$ equally into $\{VRI_i^{thread} | i=1, 2, \ldots, Thread_{disk}\}$ and assigns to each child. Here the value for $Thread_{disk}$ can differ in different iterations. This is because the possible maximum $deg_{G^o}$ in the oriented graph $G^o$ is $(M-|VRI|)/2$. It means that two children cannot hold their adjacency lists $adj_{G^o}(u_1)$ and $adj_{G^o}(u_2)$ at the same time if $(deg_{G^o}(u_1)+deg_G(u_2))$ exceeds $(M-|VRI|)/2$. In such case, further division of $VRI_{selected}$ is not considered. Instead, the apparatus may process all $VRI_{selected}$ by only one working thread. The algorithm described in FIG. 9 may be used for the steps of each child of subtask 2.

At every child of the parallel processing, the apparatus reports triangles independently in parallel. However, the apparatus synchronizes the write operation to store the triangles on storage. The apparatus may assign B size buffer for each of the children to list the triangles. Whenever the buffer becomes full, the apparatus processing a child gets the current location from a synchronized location variable and increments the location with the size of buffer.

Then the apparatus processing the child writes the content of the buffer to the evaluated place. This approach allows parallel processing to perform parallel triangulation maintaining the synchronous write operation. The present invention considers reduced size of memory for $adj^o_{mem}$ to allow buffer for every children in parallel iTri algorithm.

The apparatus in an operating system assigns its cores to different children to process their assigned tasks. If the number of cores is less than the number of children, then the apparatus may allow different children to share cores. A dedicated core for every child can ensure better performance.

The present invention considers that adjacency list $adj_{G^o}(u)$ will be fit within $(M-|VRI|)/2$ for any vertex $u \in V$. For higher degree vertices, the apparatus performs triangulation on the original undirected graph G. The apparatus lists triangles that contains edges of u, where $deg_G(u) > (M--|VRI|)/2$. Then the apparatus removes the edges from that u. At the end of this process, a smaller version G" of G will be found, where $deg'_G(u) < (M-|VRI|)/2$ for all $u \in V$. Then the apparatus takes G" as the input graph and operates further processing.

Figure 12:
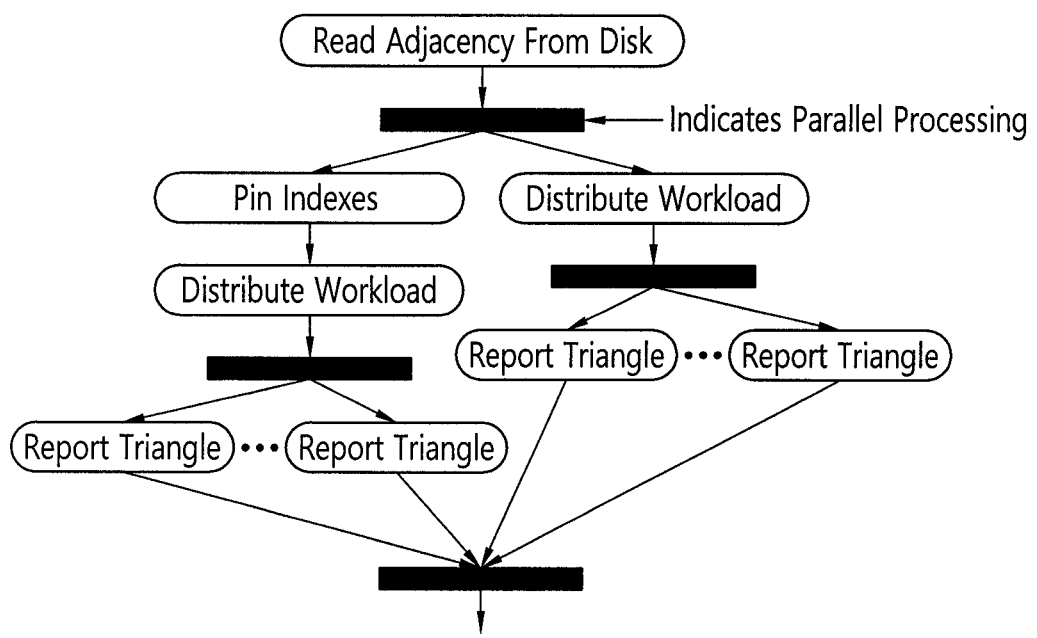
FIG. 12 illustrates the overall process of iTri in a single iteration by the ALB of vertex u.

The overall process of iTri in a single iteration is also illustrated in FIG. 12 by the ALB of vertex u.

Embodiment 4—Optimizing Potential Cone Vertex Index

In an embodiment, the apparatus and method of the present invention reduces the disk space that is required for storing potential cone vertex index. The indexed based triangulation algorithm according to the present invention indexes the potential cone vertices for all elbow vertices. But in this embodiment, a single vertex appears as potential cone vertices in multiple adjacency lists of multiple elbow vertices. Therefore, the oriented graph $G^i$ occupies the maximum disk space $|G|-|G^o|$ for potential cone vertex indices. This embodiment reduces the disk space by grouping the elbow vertices and their adjacent potential cone vertices.

A new feature to implement this embodiment is defined hereinafter.

(1) Adjacent Index Batch (AIB)

An AIB is defined as an adjacency list that contains the ALB ids which are adjacent to a group of potential cone vertices.

The elbow vertices appeared in an iteration creates a group of potential cone vertices. For any size of memory M and RALB, the apparatus can construct AIBs for each iteration during the orientation of the input graph. The size of the AIB depends on M, the number of vertices |V|, and the number of adjacency lists RALB in an ALB. The relation can be defined as following equation.

$$SizeofAIB \propto \frac{|V|}{M \times R_{ALB}} \quad \text{[Equation 2]}$$

The apparatus stores an AIB for each iteration on storage. Since the apparatus are grouping several vertices and considering only the group ids instead of the vertices, the storage space required for potential cone vertex indices is reduced significantly compared with the storage space occupied by $G^i$. Moreover, the apparatus can obtain the list of pinned ALBS for each iteration directly from the disk. iTri doesn't require further calculation to get the id of ALB for each potential cone vertex. Therefore, it can reduce the execution cost. The apparatus creates an index for all AIBs, where each index entry holds only the number of ALB ids it contains. After reading the $adj^o_{mem}$, the apparatus reads that number of ids from a storage and pin the corresponding index entries of the VRI.

Figure 13:
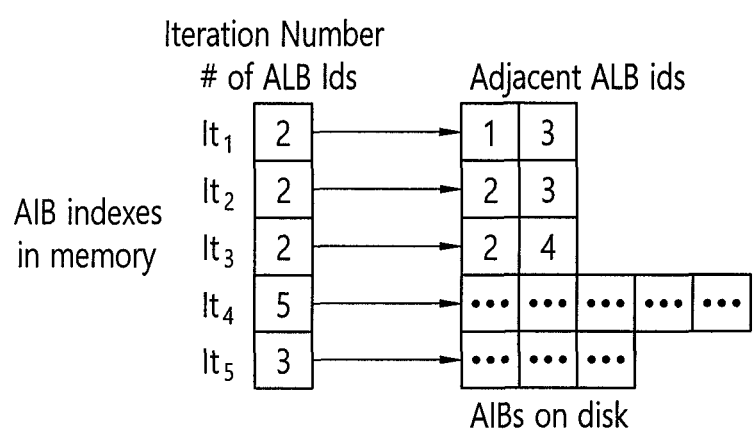
FIG. 13 illustrates the optimization mechanism and required memory and storage spaces for optimized potential cone vertex index according to the present invention.

FIG. 13 illustrates the optimization mechanism and required memory and storage spaces for optimized potential cone vertex index according to the present invention.

Referring to FIGS. 13 and 5, it is assumed that adjacency lists of elbow vertices 1-4, 5-8, and 9-12 are read into memory in the iteration 1, 2, and 3, respectively (In FIG. 13, $It_1$ means iteration 1). According to FIG. 5, vertices 2, 3, 4, 6, 8, and 9 are appeared as the potential cone vertices in iteration 2. However, only ALB2 and ALB3 are pinned for these potential cone vertices (see FIG. 7). The apparatus stores the AIB for iteration 2 on storage which contains the id of ALB2 and ALB3. Notice that the size of storage space is significantly reduced for potential cone vertex index in iteration 2.

Embodiment 5—Bounding Available Memory

The method and apparatus of present invention never exceeds the limit of available memory. It calculates the memory required for different data structures on the fly.

In this embodiment, for given a graph G=(V,E) having |V| number of vertices, and the number of adjacency lists in an ALB, the apparatus distributes the available memory M for different data structures as following conditions.

TABLE 5 i. Vertex range index, $|VRI| = \dfrac{|V| \times 3}{R_{ALB}}$ ii. Adjacency lists of elbow vertices, $|adj^o_{mem}| = \dfrac{M - |VRI|}{2}$ iii. Adjacency lists of a potential cone vertex, $\dfrac{M - |VRI|}{2 \times Thread_{disk}}$ The possible number of adjacency lists of potential cone vertices that can be loaded into memory at any time of an iteration is $Thread_{disk}$. However, the maximum size of the adjacency list of a vertex in $G^o$ is (M−|VRI|)/2. Therefore, the apparatus dynamically calculates the $Thread_{disk}$ so that the required memory for adjacency lists of potential cone vertices never exceeds the available memory. For optimizing potential cone vertex index, the apparatus additionally keeps the indexes for AIBs. The size of indexes is exactly equal to the number of iterations. The number of iterations is very less which can be defined from 2 |G°|=(M−|VRI|).

Experiment Results

Extensive experiments for comparing the present invention and the previous MGT algorithm for triangle listing under the same experimental environment have been conducted. Besides, this experiments compare the parallel version of MGT (PMGT) and the present invention.

(1) Experimental Setup

The experimental environment is set up with a 64-bit Intel® Core i7 3.3 GHz CPU having 6 cores. All algorithms have been executed in Linux (Ubuntu 12.04) Operating System. The data block size was 4 KB, set by the system. All the algorithms were implemented in C and compiled with the gcc compiler with the optimizer option O3. Pthreads API for the parallel tasks is used. In each and every cases, memory size M is set as the percentage of the graph size which was converted to the number in bytes. The consumed memory by each algorithm never exceeds M under any circumstances.

All the graphs used in the experiments are stored in binary format, where each item of the graph is represented by a 4-byte integer. Every adjacency list of the graph starts with a vertex id, degree of that vertex followed by the adjacencies.

The experiment counts the number of I/O requests, and overall execution time for different size of memory for both algorithms. Since all algorithms output same number of triangles, the experiment excludes the I/O cost for storing the triangles on disk in all cases. The experiment also observes the effect of different number of adjacency lists in each ALB for proposed algorithm. Finally the experiment compares the result for different number of threads.

In every case, all algorithms start with taking the input graph without orientation. Orientation of the input graph is occurred at the very beginning stage of the execution. In case of the proposed system, we add the cost for writing and reading the graph for indexing potential cone vertex.

(2) Datasets

The experiment uses datasets World Wide Web of UK (WU) and LiveJournal (LJ). These datasets were also used by Hu in MGT [16]. This experiments consider another two datasets, California Road Network (RN) and Friendster (FS) that are the smallest and largest among the four respectively. In WU, vertices represent the pages and edges represent the hyperlinks. This dataset is collected from the YAHOO webspam dataset (http://barcelona.research.yahoo.net). LJ is collected from Stanford University (http://snap.stanford.edu). This is a social network (http://www.live-journal.com), where vertices represent members and friendship between members is represented by edges. RN, collected from Stanford University (http://snap.stanford.edu), contains the road network information of California of USA. In this dataset each junction is represented by a vertex and edges represent the roads that are connected to that junction. FS is a dataset of an online gaming network. Each gamer of the network is considered as a vertex and each connection between two garners is represented as an edge. This dataset was collected from web archive (https://archive.org/details/friendster-dataset-201107). All datasets were organized by a list of vertices along with its adjacencies. Size on storage, number of vertices, edges, and triangles of each datasets are mentioned in Table 6.

TABLE 6

| Datasets | RN | LJ | WU | FS |
| --- | --- | --- | --- | --- |
| Size on Disk | 47 MB | 200 MB | 3.3 GB | 7.4 GB |
| \|V\| | 1.9M | 4.8M | 18.7M | 68.3M |
| \|E\| | 2.7M | 42M | 405.4M | 1.8 B |
| \|E\|/\|V\| | 1.4 | 8.4 | 21.6 | 26.5 |
| # of Triangles | 120K | 285M | 14.9 B | 4.1 B |

(3) Experimental Result

Effect of V RI and parallelism. The experiment evaluates the effect of indexing technique and parallelism according to the present invention. The experiment uses WU dataset. The experiment computes the number of I/Os and wall clock time taken by MGT, a parallel version of MGT (PMGT), iTri and a sequential version of iTri (iTri-S). The experiment considers the memory size as 1%, 4%, 8%, and 16% of each graph. Note that limiting the memory to such smaller sizes actually poses the significantly smaller memory available for processing large graphs. For iTri-S and iTri, the experiment sets the value for RALB as 100. In case of PMGT, the experiment divides the graph into several partitions virtually. Each child of PMGT reads and processes each partition by joining with $E_{mem}$. Every child keeps at least one adjacency list at a time. Therefore, the experiment considers to read M=2 size $E_{mem}$ rather than cM size so that the remaining memory can be used by the children to keep adjacency list while processing. Notice that, PMGT has to perform more iterations than MGT. Similarly, the experiment reads cM size adjacency lists for iTri-S since it requires only one adjacency list in memory at any time. Notice that, iTri-S performs less iterations than iTri.

Figure 14:
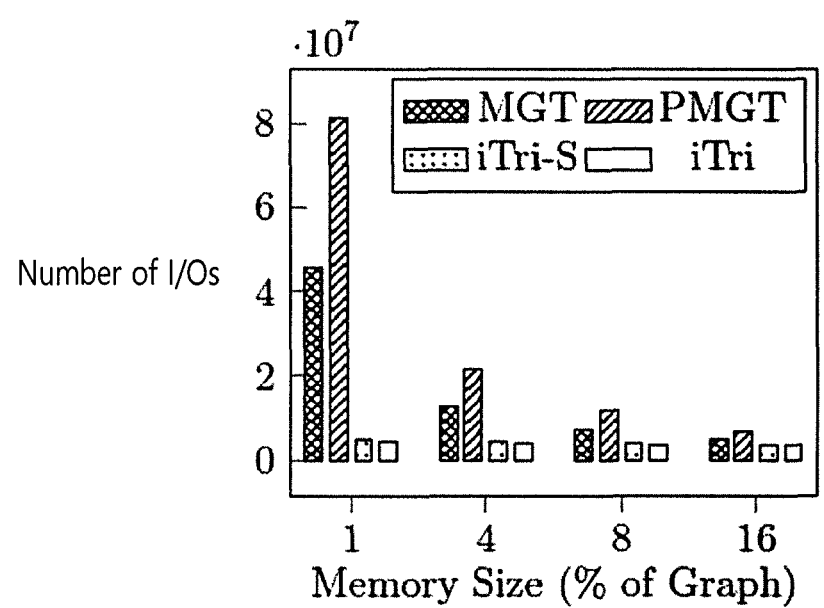
FIG. 14 shows an experimental result which plots the number of I/Os required by different algorithms for different sizes of memory according to the present invention.

FIG. 14 shows an experimental result which plots the number of I/Os required by different algorithms for different sizes of memory according to the present invention.

Since both MGT and PMGT performs full scan over graph, they requires higher number of I/O requests than the index based iTri-S and iTri. PMGT performs higher number of I/Os than MGT since PMGT performs more full scans over the graph. Even though iTri performs more iteration than iTri-S, less number of indices is pinned in iTri for less size of $adj^o{}_{mem}$. In both cases, they read only the pinned adjacency lists. Therefore, both iTri-S and iTri performs almost equal number of I/Os.

Figure 15:
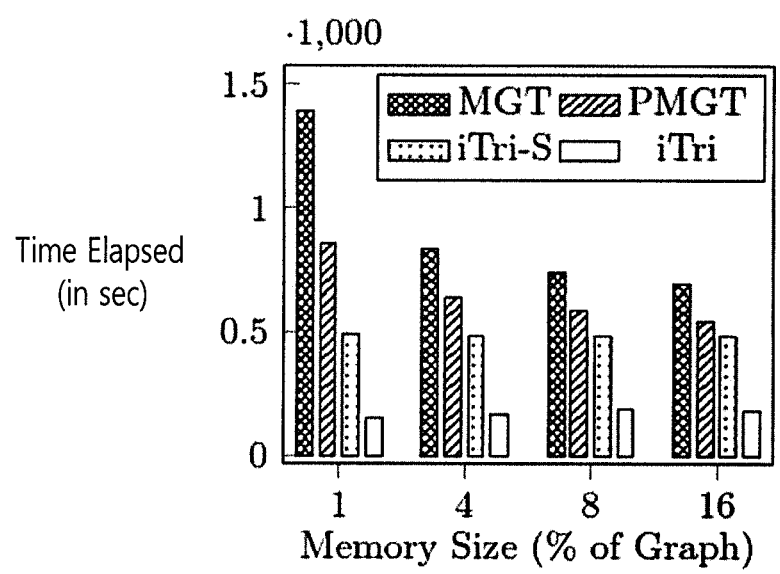
FIG. 15 shows overall cost required by different algorithms for different size of memory.

FIG. 15 shows overall cost required by different algorithms for different size of memory.

Since iTri-S and iTri are indexed and they do not require to perform full scan to process all adjacency lists of the graph. Therefore, both of them outperform MGT and PMGT. Both parallel algorithms, PMGT and iTri outperforms their sequential versions since parallelism allows each child to process the subtasks concurrently. Even though PMGT performs higher number of I/Os than MGT, it shows better performance because of parallelism.

Parallel PMGT is outperformed by sequential iTri-S. It implies that present invention can reduces the number of I/Os effectively that impacts on the overall cost of algorithm. Sequential iTri-S is outperformed by parallel iTri, which implies that parallelism ensures speed up for iTri than iTri-S.

I/O performance. The experiment calculates the number of I/Os requested by iTri and MGT for different size of memory for all datasets. For iTri, the experiment also checks I/O cost by varying the values for RALE to 100, 500 and 1000.

Figure 16:
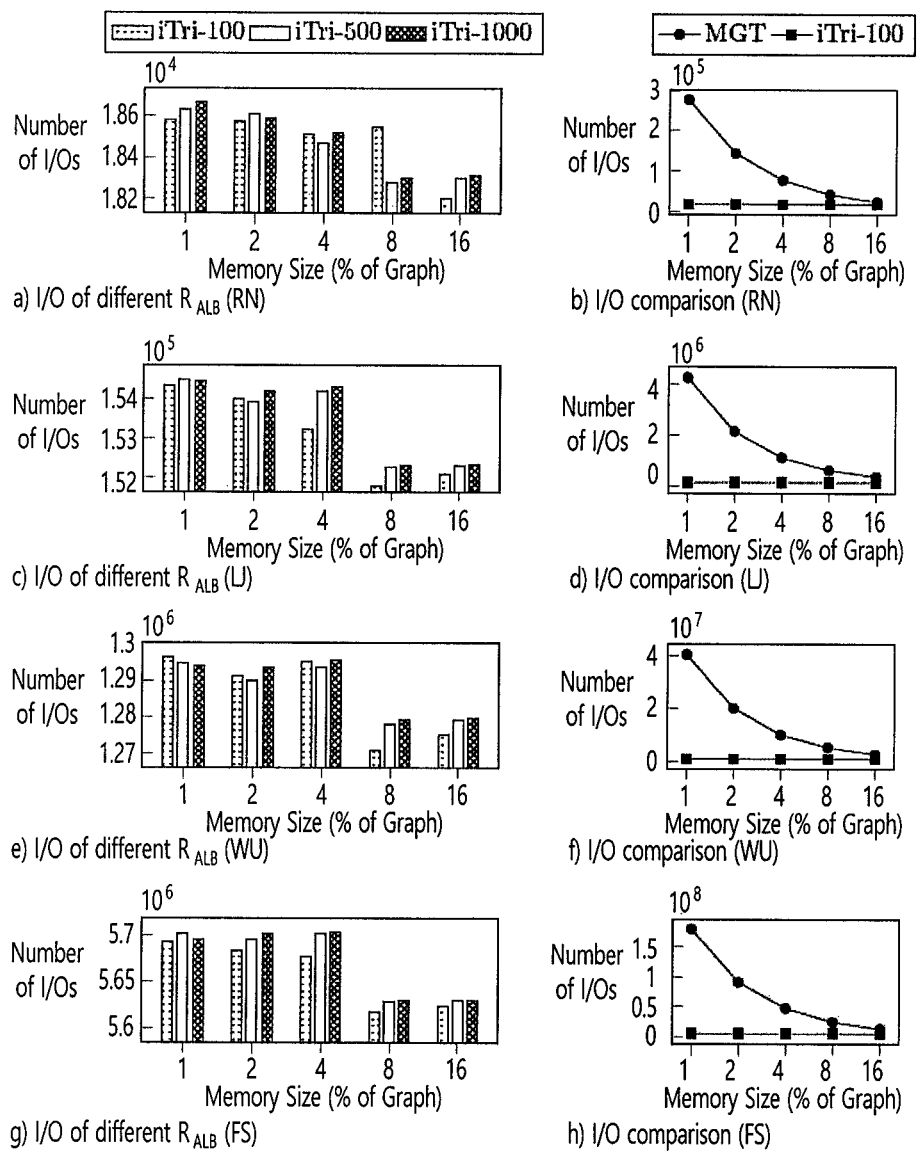
FIG. 16 shows I/O-effect for different value of RALB and I/O-efficiency comparison.

FIG. 16 illustrates the experimental result of this variation.

Referring to FIG. 16, first column shows that, variation of ALB has negligible effect on the number of I/O requests in each memory size. We compare I/O cost of iTri and MGT in second column of FIG. 16. In this experiment, value for RALE is set to 100. This experiment observes, MGT requires more I/Os as the memory size decreases. Since MGT performs full scan of the graph in every iteration, the number of I/Os increases as memory size decreased. However, proposed iTri requires almost consistent number of I/Os for any size of memory. The reason behind this is nothing but the indexing. In every iteration, iTri only needs to read the pinned ALB of iTri. Smaller memory size ensures smaller number of pinned ALB. Therefore, total number of I/Os does not vary significantly even for smaller memory. Therefore, our proposed iTri algorithm outperforms MGT by an order of magnitude (in terms of I/Os) when the memory size is set to 1% of the graph.

Figure 17:
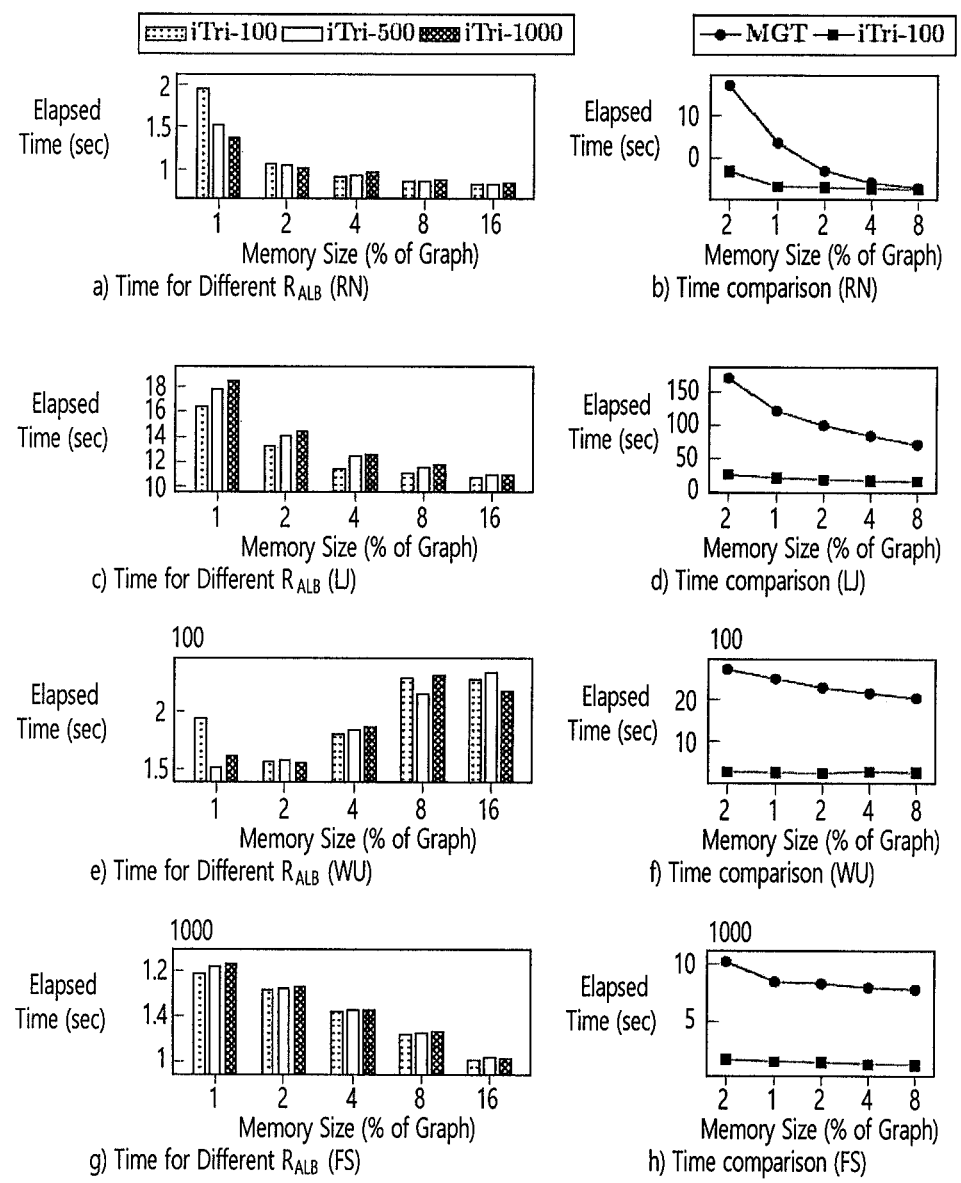
FIG. 17 shows an effect on execution time for different value of $R_{ALB}$ and execution time comparison.

Execution Time. Number of I/Os effects directly on the execution time for every algorithms that we observe in the second column of FIG. 17. MGT scans the full graph in every iteration, which considers joining operation for all u∈V. Since the size of memory increased, MGT performs less number of iteration that ensures less scan of graph, so triangle calculation. Therefore, execution time for MGT decreases while memory size is increased. However, the present invention searches triangles for only potential cone vertex and V RI allows to read adjacency list of only potential vertex, it takes almost consistent execution time for any size of memory. Moreover, V RI facilitates to read and process the data pinned by an index entry in parallel. By reading less number of selective data and processing in parallel, the present invention outperforms MGT by 3 to more than 8 times. The experiment includes the effect on overall execution time for different size of RALB in the first column of FIG. 17.

Figure 18:
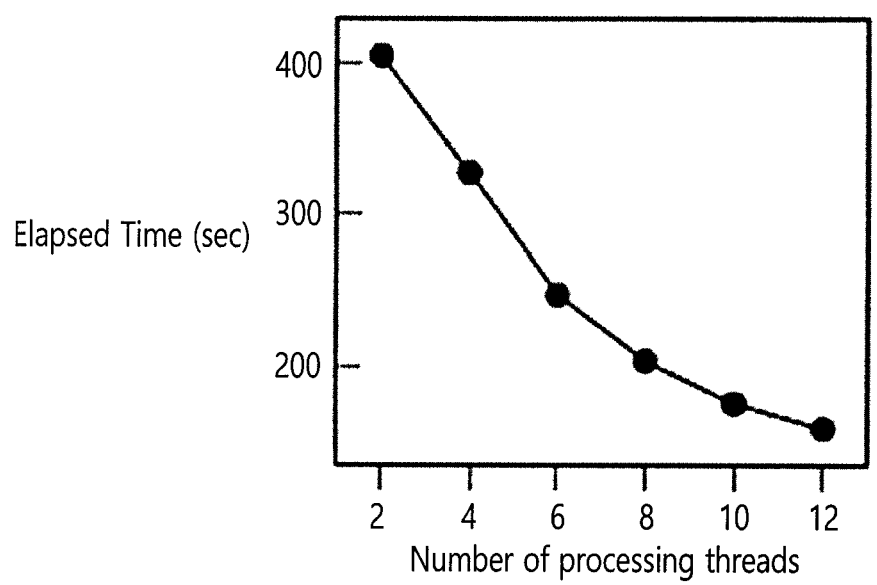
FIG. 18 shows disk space occupied by $G^i$ and AIB for different value of $R_{ALB}$.
Figure 19:
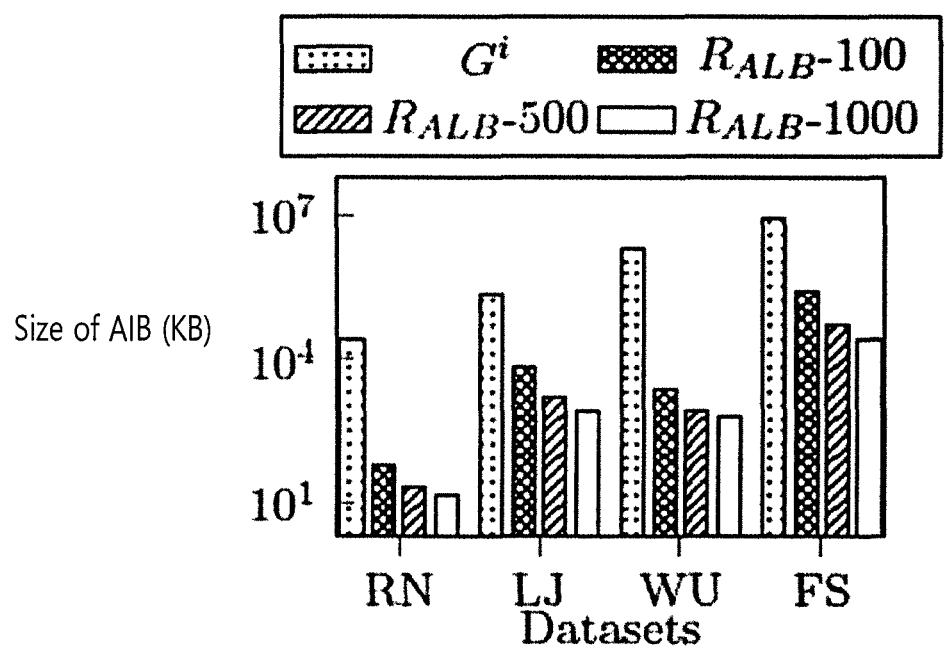
FIG. 19 shows effect of number of processing threads for WU dataset.

Optimized PCV Index for different RALB. The disk space required for AIB varies for the different values of RALB. The experiment measures the size of AIB for all four datasets by setting of the memory size 4% of the graph and varying the values of RALE to 100, 500, and 1000. Experimental results are plotted in FIG. 18. FIG. 18 shows that AIB requires 30 to 3,000 times less disk space than $G^i$. This significant improvement is achieved since AIB indexes group of ALBs for the possible cone vertices appeared in each iteration. Since higher value of RALE creates less number of ALBs and AIB only contains the ids of ALBs, the size of AIB decreases as the value of $R_{ALB}$ increases.

The observed result of this experiment supports earlier assumption of the present invention. Varying the number of Processing Threads. The final experiment shows the performance of the present invention by using different numbers of processing threads. The experiment is done on the WU dataset by setting of the memory size 5% of the graph and 100 for RALE. Experimental results are given in FIG. 18. Since the task is distributed to higher number of processing threads, overall execution time decreases while the number of threads increases. It denotes that the performance of our parallel algorithm depends on the number of cores available in single computer. Therefore, highly performance gain can be achieved by ensuring more CPU cores in a single computer.

The present invention is synchronous parallel system. Therefore it waits until the last child completes the processing. Since the size of memory increased, the children assigned to perform self-join operation in memory have to join more adjacency lists. Thus they take more time for larger memory and demand more children for joining. In case of WU graph, it is observed that execution time increases as memory size increases. This is because this graph is clustered and so many edges are processed by the processing threads assigned to join in memory edges.

Figure 20:
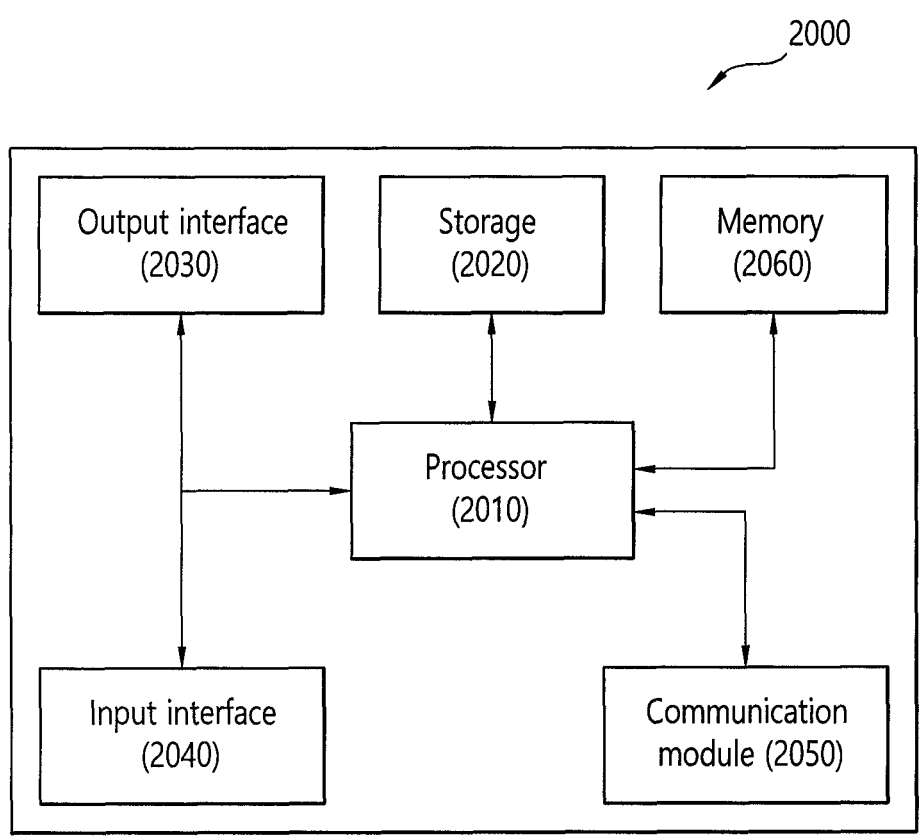
FIG. 20 shows a block diagram of an apparatus for processing graphic data based on triangle listing according to the present invention.

FIG. 20 shows a block diagram of an apparatus for processing graphic data based on triangle listing according to the present invention.

Referring to FIG. 20, the apparatus 2000 includes at least one of a processor 2010, a storage 2020, an output interface 2030 outputting a result of the processor 2010, an input interface 2040 which receives data as an input from a user or difference apparatus, a communication module 2050 for transmitting or receiving data via wired or wireless networks, and a memory 2060.

The processor 2010 may include ASIC(application-specific integrated circuit), other chipsets, logical circuit and/or data processing apparatus. The processor 2010 may include one or more cores to process massive graphic data in parallel. The processor 2010 may perform all the operations, functions, steps, methods, algorithms, mechanisms and techniques in overall embodiments of the detailed description.

The storage 2020 stores massive graph data. The functions and data structure of the storage 2020 are the same as in the overall embodiments of the detailed description. The storage 2020 is also referred to as a disk and can be located outside of the apparatus 2000. The storage 2020 may also include a disk drive, ROM(read-only memory), RAM(random access memory), flash memory, DRAM, SDRAM, memory card, and any type of storing medium.

The communication module 2050 may include a radio frequency antenna or modem, specifically baseband signal circuit for processing radio signal.

When the method of processing graphic data using based triangle listing according to the present invention is implemented as a software or an app, and method according to the present invention can be implemented by means of any combination of the processor 2010, the storage 2020, the output interface 2030, the input interface 2040, the communication module 2050 and the memory 2060.

All the operations, functions, steps, methods, algorithms, mechanisms and techniques in overall embodiments of the detailed description may be stored in the storage 2020 or the memory 2060, and performed by the processor 2010.

The memory 2060 can be included in the processor 2010 or separately exist from the processor 2010.

The storage 2020 and the memory 2060 may be electrically coupled to the processor 2010 so that the processor 2010 may read data from the storage 2020 and/or the memory 2060, and write data to the storage 2020 and/or the memory 2060.

While the present invention has been particularly shown an described with reference to exemplary embodiments thereof, it will be understood by those of ordinary skill in the art that various changes in form and details may be made therein without departing from the spirit and scope of the present invention as defined by the following claims.

What is claimed is:

1. A method of processing graph data using index based triangle listing performed by a graph data processing apparatus, the method comprising:
   receiving an original graph having vertices and edges;
   directing an edge from a first vertex to a second vertex by comparing a degree of the first vertex with a degree of a second vertex to generate a first oriented graph and a second oriented graph from the original graph, wherein the first oriented graph comprises no information on incoming edges, and the second oriented graph comprises no information on outgoing edges;
   generating an adjacency list batch (ALB) for the vertices based on the difference between a first vertex identification (ID) and a last vertex ID in the ALB and generating a vertex range index (VRI) to indicate the ALB, wherein the-VRI includes at least one of an address of a vertex of the ALB, maximum degree of the vertex, and a flag indicating the ALB;
   checking whether an elbow vertex of the first oriented graph is included in a vertex set adjacent to each vertex of the second oriented graph to determine a potential cone vertex, wherein the elbow vertex has one incoming edge and one outgoing edge in a triangle, and the potential cone vertex is a candidate of cone vertices having at least two outgoing edges in a triangle;
   obtaining a cone vertex based on the elbow vertex, the potential cone vertex, VRI and the ALB; and
   reporting a triangle including the cone vertex and the elbow vertex.

2. The method of claim 1, wherein the ALB includes at least one of an index of the vertex, a degree of the vertex and an adjacency list of the vertex.

3. The method of claim 1, wherein the first oriented graph is an oriented version of the original graph having vertices with outgoing edges, and the second oriented graph is an oriented version of the original graph having vertices with incoming edges.

4. The method of claim 1, wherein vertices in the ALB are listed in an increasing order of the indices of the vertices.

5. The method of claim 1, wherein the adjacency list of the vertex is a variable length data.

6. The method of claim 1, wherein the size of the VRI is equal to the total ALBs in the oriented graph.

7. The method of claim 1, wherein the triangle includes a third vertex which is obtained from an intersection of a first adjacent set and a second adjacent set, the first adjacent set is a set of adjacent vertices of each cone vertex in the first oriented graph, and the second adjacent set is a set of adjacent vertices of each elbow vertex in the first oriented graph.

8. The method of claim 1, further comprising:
   pinning or unpinning for reading the ALB pointed by the VRI into a memory based on the flag.

9. The method of claim 8, wherein the obtaining a cone vertex is performed based on a self-joining operation.

10. The method of claim 9, wherein the pinning or unpinning, and the self-joining operation regarding the ALB are performed separately and concurrently in different processing cores.

11. An apparatus of processing graph data using index based triangle listing, the apparatus comprising:
    a memory configured to store data which is used or processed by a processor;
    an input interface configured to receive an original graph having vertices and edges as an input;
    an output interface configured to output a triangle processed by the processor; and
    the processor configured to:
      direct an edge from a first vertex to a second vertex by comparing a degree of the first vertex with a degree of a second vertex to generate a first oriented graph and a second oriented graph from the original graph, wherein the first oriented graph comprises no information on incoming edges, and the second oriented graph comprises no information on outgoing edges;
      generate an adjacency list batch (ALB) for the vertices based on the difference between a first vertex identification (ID) and a last vertex ID in the ALB and generate a vertex range index (VRI) to indicate the ALB, wherein the-VRI includes at least one of an address of a vertex of the ALB, maximum degree of the vertex, and a flag indicating the ALB;
      check whether an elbow vertex of the first oriented graph is included in a vertex set adjacent to each vertex of the second oriented graph to determine a potential cone vertex, wherein the elbow vertex has one incoming edge and one outgoing edge in a triangle, and the potential cone vertex is a candidate of cone vertices having at least two outgoing edges in a triangle;

obtain a cone vertex based on the elbow vertex, the potential cone vertex, VRI and the ALB; and report a triangle including the cone vertex and the elbow vertex.

12. The apparatus of claim 11, wherein the ALB includes at least one of an index of the vertex, a degree of the vertex and an adjacency list of the vertex.

13. The apparatus of claim 11, wherein the first oriented graph is an oriented version of the original graph having vertices with outgoing edges, and the second oriented graph is an oriented version of the original graph having vertices with incoming edges.

14. The apparatus of claim 11, wherein vertices in the ALB are listed in an increasing order of the indices of the vertices.

15. The apparatus of claim 11, wherein the adjacency list of the vertex is a variable length data.

16. The apparatus of claim 11, wherein the size of the VRI is equal to the total ALBs in the oriented graph.

17. The apparatus of claim 11, wherein the triangle includes a third vertex which is obtained from an intersection of a first adjacent set and a second adjacent set, the first adjacent set is a set of adjacent vertices of each cone vertex in the first oriented graph, and the second adjacent set is a set of adjacent vertices of each elbow vertex in the first oriented graph.

18. The apparatus of claim 11, wherein the processor is further configured to pin or unpin for reading the ALB pointed by the VRI into a memory based on the flag.

19. The apparatus of claim 18, wherein the obtaining a cone vertex is performed based on a self-joining operation.

20. The apparatus of claim 19, wherein the pinning or unpinning, and the self-joining operation regarding the ALB are performed.

* * * * *